United States Patent
Schroeder et al.

(10) Patent No.: US 7,288,495 B2
(45) Date of Patent: Oct. 30, 2007

(54) PHOTOREFRACTIVE GLASS AND OPTICAL ELEMENTS MADE THEREFROM

(75) Inventors: Joeseph F Schroeder, Lindley, NY (US); Nicholas F Borrelli, Elmira, NY (US); George B Hares, Corning, NY (US)

(73) Assignee: Corning Incorporated, Corning, NY (US)

( * ) Notice: Subject to any disclaimer, the term of this patent is extended or adjusted under 35 U.S.C. 154(b) by 280 days.

(21) Appl. No.: 11/018,725

(22) Filed: Dec. 20, 2004

(65) Prior Publication Data

US 2005/0141847 A1 Jun. 30, 2005

Related U.S. Application Data

(60) Provisional application No. 60/533,859, filed on Dec. 31, 2003.

(51) Int. Cl.
*C03C 3/112* (2006.01)
*C03C 4/00* (2006.01)
*C03C 6/02* (2006.01)

(52) U.S. Cl. .................. 501/57; 501/13; 501/27; 501/30

(58) Field of Classification Search ............ 501/13, 501/27, 30, 32, 57
See application file for complete search history.

(56) References Cited

U.S. PATENT DOCUMENTS

| 2,515,936 A | 7/1950 | Armistead, Jr. ........ 49/92 |
| 2,651,145 A | 9/1953 | Stookey ........ 49/88 |
| 4,017,318 A | 4/1977 | Pierson et al. ........ 106/52 |
| 4,092,139 A | 5/1978 | Ference ........ 65/30 |
| 4,134,747 A | 1/1979 | Pierson et al. ........ 65/30 |
| 4,212,919 A * | 7/1980 | Hoda ........ 428/410 |
| 4,328,299 A * | 5/1982 | Beall et al. ........ 430/13 |
| 4,979,975 A | 12/1990 | Borrelli ........ 65/30.11 |
| 5,019,538 A * | 5/1991 | Borrelli et al. ........ 501/13 |
| 2002/0045104 A1 | 4/2002 | Efimov et al. ........ 430/2 |

FOREIGN PATENT DOCUMENTS

JP 63166736 9/1988

* cited by examiner

*Primary Examiner*—J. A. Lorengo
*Assistant Examiner*—Elizabeth A Bolden
(74) *Attorney, Agent, or Firm*—Timothy M. Schaeberle

(57) ABSTRACT

The present invention provides an alkali alumino-silicate Na—F-containing glass material and a method of making the alkali alumino-silicate Na—F-containing glass material, with the glass material capable of being made photosensitive and thus formed into optical elements at wavelengths ranging between about 240 to 350 nm, and more particularly at the standard 248 nm wavelength of excimer lasers. Also disclosed is optical element wherein a refractive index pattern formed in the alumino-silicate Na—F containing glass material, the refractive index pattern including regions of high refractive index and regions of low refractive index, the difference between the refractive indices of the high refractive index regions and the low refractive index regions being at least $4 \times 10^{-5}$ at a wavelength of 633 nm.

5 Claims, 2 Drawing Sheets

PHOTOREFRACTIVE GLASS AND OPTICAL ELEMENTS MADE THEREFROM

CROSS-REFERENCE TO RELATED APPLICATION

The present application claims priority to the U.S. Provisional Application with Ser. No. 60/533,859 filed on Dec. 31, 2003.

BACKGROUND OF THE INVENTION

1. Field of the Invention

The present invention relates generally to photorefractive glasses, and more specifically to photorefractive glasses for use as glass-based optical elements having a refractive index pattern formed therein.

2. Technical Background

Diffractive optical elements find use in a wide variety of fields. For example, diffractive optical elements are useful for filtering, beam shaping and light collection in display, security, defense, metrology, imaging and communications applications.

One especially useful diffractive optical element is a Bragg grating. A Bragg grating is formed by a periodic modulation of refractive index in a transparent material. Bragg gratings reflect wavelengths of light that satisfy the Bragg phase matching condition, and transmit all other wavelengths. Bragg gratings are especially useful in telecommunications applications; for example, they have been used as selectively reflecting filters in multiplexing/demultiplexing applications; and as wavelength-dependent pulse delay devices in dispersion compensating applications.

Bragg gratings are generally fabricated by exposing a photosensitive material to a pattern of radiation having a periodic intensity. Many photosensitive materials have been used; however, few have provided the desired combination of performance and cost. For example, Bragg gratings have been recorded in germanium-doped silica glass optical fibers; while such gratings are relatively robust, the fiber geometry and high melting point of the material make these gratings inappropriate for many optical systems. Bragg gratings have also been recorded in photorefractive crystals such as iron-doped lithium niobate. These filters had narrow-band filtering performance, but suffered from low thermal stability, opacity in the UV region, and sensitivity to visible radiation after recording. Photosensitive polymers have also been used as substrates for Bragg gratings; however, devices formed from polymeric materials tend to have high optical losses and high temperature sensitivity.

Photosensitive glasses based on the $Ce^{3+}/Ag^+$ redox couple have been proposed as substrates for the formation of diffractive optical elements. For example, U.S. Pat. No. 4,979,975 (Borrelli) discloses a photosensitive glass containing, in weight percent on the oxide basis, about 14-18% $Na_2O$, 0-6% ZnO, 6-12% $Al_2O_3$, 0-5% $B_2O_3$, 65-72% $SiO_2$, 0-0.2% $Sb_2O_3$, 0.007-0.04% Ag, 0.008-0.005% $CeO_2$, 0.7-1.25% Br and 1.5-2.5% F. In these materials, exposure to radiation ($\lambda$~366 nm) causes a photoreduction of $Ag^+$ to colloidal $Ag^0$ and $Ce^{3+}$ to $Ce^{4+}$, which acts as a nucleus for crystallization of a NaF phase in a subsequent heat treatment step. These glasses had very high absorbances at wavelengths less than 300 nm, making them unsuitable for use with commonly used 248 nm excimer laser exposure systems.

More recently, disclosed in U.S. patent application Ser. No. 2002/0045104 (Glebov et. al.) is a NaF-based photosensitive glass that by the appropriate exposure and thermal development, produces a refractive index change in the near infrared that accompanied the development of the NaF phase; the glass composition falling within that composition described above in the Borrelli reference. This effect opened the possibilities for applications to optical.

Devices based upon a photorefractive effect, with examples including Bragg gratings and holographic elements. The specific composition disclosed by Glebov et al was very similar to that of the original Corning (Stookey et al). As disclosed above, the composition the important constituents are the concentrations of Ce+3 (photosensitizer), Ag+ (photonucleus), and F, with the latter controlling the amount of NaF that can be produced and consequently the maximum amount of possible induced refractive index change. In order to achieve the photosensitive/photorefractive effect in the glass Glebov's process, like the above described Borrelli reference involved the exposure to light in the vicinity of 300-nm, or greater, followed by a heat treatment of 520 C for 2 hours.

It would be beneficial, and is thus an objective of this invention to be able to produce photosensitive glasses, and thus optical elements, as a result of exposure to industry standard 248 nm wavelength (KrF excimer laser). The reason for this is that the exposure methods, equipment, capability, and reliability and know-how utilizing 248 nm excimer laser exposure to make accurate optical devices is already in place throughout the telecommunication industry. This has come about because of the wide use of fiber Bragg gratings which are fabricated in this manner.

SUMMARY OF THE INVENTION

Disclosed herein is a photosensitive/photorefractive glass composition which may be made photorefractive and thus formed into optical elements at wavelengths ranging between about 240 to 350 nm, and more particularly at the standard 248 nm wavelength of excimer lasers. The glass composition comprises, in weight percent as calculated from the batch, about 65% to about 75% $SiO_2$, about 5% to about 12% $Al_2O_3$, about 14-18% $Na_2O$, about 0 to about 7.5% ZnO, up to about 0.1% of a weak reducing agent of either $Sb_2O_3$ or SnO, about 0.005 to 0.5% Ag, about 0.5 to 1.5% Br, about 1.5 to 3.0% F, about 0-0.1% $CeO_2$, and, optionally an amount of $GeO_2$ up to 0.5%. It is the composition itself in combination with the melting conditions which result in a photorefractive glass that exhibits no $Ce^{4+}$ is present in the so-formed glass.

Another embodiment of the present invention relates to an optical element including an alkali alumino-silicate NaF-containing glass material exhibiting no $Ce^{4+}$ in the so-formed glass material; and a refractive index pattern formed in the alkali alumino-silicate NaF-containing glass material, the refractive index pattern including regions of high refractive index and regions of low refractive index, the difference between the refractive indices of the high refractive index regions and the low refractive index regions being at least $4\times10^{-5}$ when measured at a wavelength of 633 nm.

Another embodiment of the present invention relates to a method of making an optical element, the method including the steps of providing a alkali alumino-silicate NaF-containing glass material; exposing the glass material to patterned ultraviolet radiation having a peak wavelength of between about 240 to 350 nm, thereby forming exposed regions and unexposed regions; and subjecting the exposed glass material to a heat treatment to form the optical element, wherein exposed regions of the glass material have a substantially different refractive index than unexposed regions of the glass material after being subjected to the heat treatment.

The devices and methods of the present invention result in a number of advantages over prior art devices and methods. For example, the present invention provides a method suitable for the fabrication of bulk (i.e. not optical waveguide) Bragg grating devices. The method uses a photosensitive glass material that may be fabricated using conventional glass melting techniques, providing for simplified manufacture of a variety of shapes. The method may be performed using a conventional 248-nm laser exposure system. The optical elements of the present invention have high photo-induced refractive index changes that are stable at elevated temperatures.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE PREFERRED EMBODIMENTS

Figure 1:
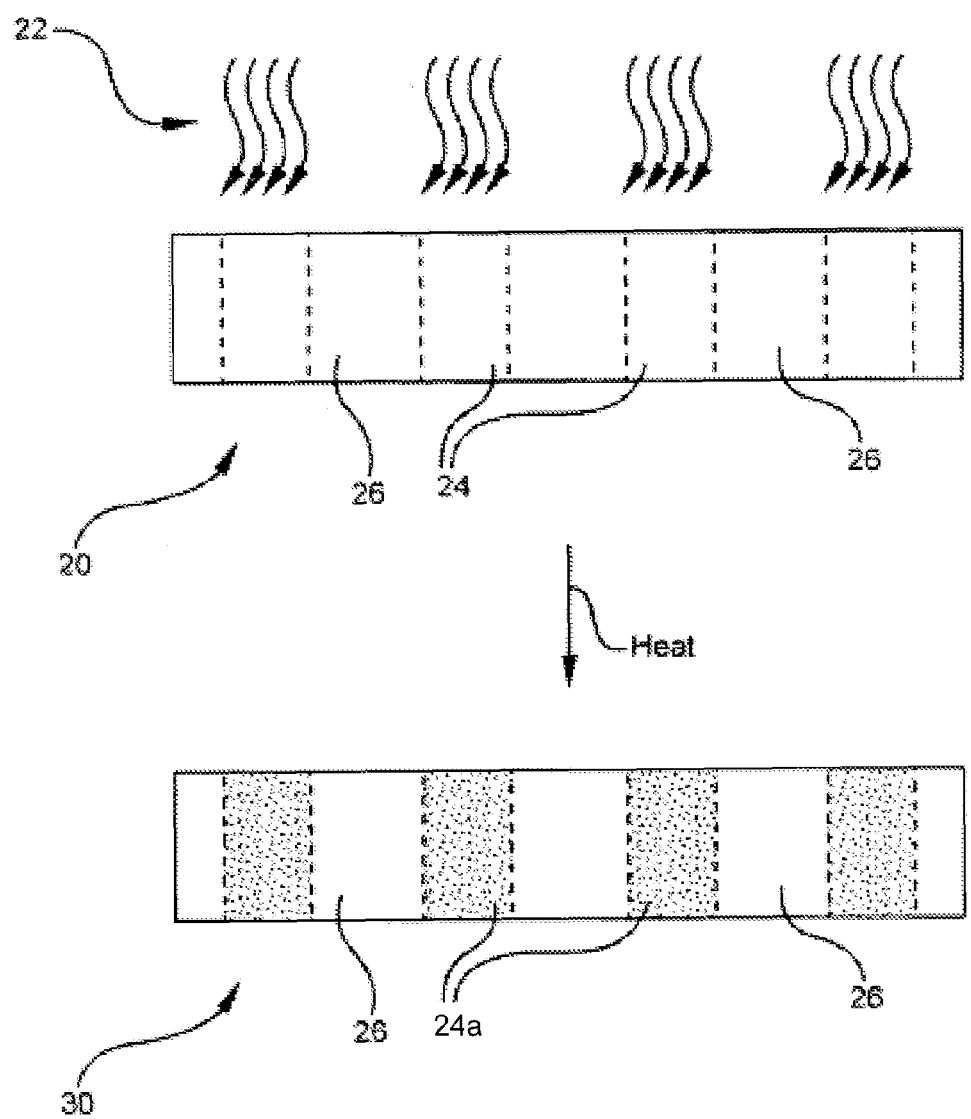
FIG. 1 is a schematic view of a method according to one embodiment of the present invention.

The photosensitive glass materials disclosed in the instant embodiment can be made photosensitive, and thus formed into optical elements, at exposure wavelengths ranging between about 240 to 350 nm. More particularly, certain embodiments of the inventive glass composition can be exposed at the standard 248 nm wavelength of excimer lasers.

It is known to those skilled in the art that exposure wavelength is determined by the excitation spectrum of the $Ce^{+3}$. It is generally understood that the photoelectron is produced by the excitation of $Ce^{+3}$ to $Ce^{+4}$. This transition is centered at 308-nm. In general, the amount of $Ce^{+3}$ that can be sustained under normal melting conditions is limited and a significant amount of $Ce^{+4}$ is present which absorbs strongly below 300-nm. The inventors thus surmised that exposure at 248-nm would thus limit the photoreaction to the surface. As such, it followed that in applications where an induced grating is required to be as thick as 1-mm, so as to make it accessible to a free space input/output configuration, the convenient and readily available 248-nm exposure systems would not be usable. This fact led to the conclusion that that glasses which exhibited the presence of the $Ce^{4+}$ would not serve as glasses which could be used as an alternative to the photorefractive Ge-based glasses typically used in optical elements.

Based on the above principles the inventors set out to form certain inventive glasses which when melted exhibit no Ce4+ in the so-formed glass material. This absence of $Ce^{4+}$ feature can be accomplished in one of two ways: (1) a glass composition exhibiting a complete absence of Ce in the batched glass composition; or (2) a glass composition having a small amount of Ce in batched glass which is melted under optimum redox conditions which inhibits the conversion of the $Ce^{3+}$ to $Ce^{4+}$.

The glass composition suitable for use in the present invention is an alumino-silicate NaF-containing glass material. The range of constituents in the glass material compositions is given below in Table 1. Amounts are given in weight percent on an as-batched basis, as is customary in the art.

TABLE 1

| Species | Suitable ranges |
| --- | --- |
| $SiO_2$ | about 65% to about 75% |
| $Al_2O_3$ | about 5% to about 12% |
| $Na_2O$ | about 14%-18% |
| ZnO | about 0% to 7.5% |
| $Sb_2O_3$ or SnO | up to 0.1% |
| Ag | about 0.005% to 0.5% |
| Br | about 0.5% to 1.5%, |
| $CeO_2$, | about 0-0.1% |
| $GeO_2$ | up to 0.5% |

An especially desirable family of glass material compositions comprises, about 70 to % $SiO_2$, 5 to 7.5% $Al_2O_3$, 15-17.5% $Na_2O$, 5 to 7% ZnO, 0.01 to 0.1% SnO, 0.01 to 0.05% $Sb_2O_3$, 0.01 to 0.035% Ag, 1.0 to 1.5% Br, 2.0 to 3.0% F 0-0.1% $CeO_2$. More preferably, the photorefractive glass comprises in weight percent as calculated from the batch, 72% $SiO_2$, 6.9% $Al_2O_3$, 16.2% $Na_2O$, 5.0% ZnO, 0.05% SnO, 0.02% $Sb_2O_3$, 0.01% Ag, 1.1% Br, 2.5% F, 0-0.1% $CeO_2$.

Another desirable glass family for use in the instant invention comprises about 66.9% $SiO_2$, 6.5% $Al_2O_3$, 16.3% $Na_2O$, 6.5% ZnO, 0-1.0% $K_2O$, 0.03 to 0.05% Ag, 1.26% Br, 2.0 to 3.0% F and 0.01-0.1% $CeO_2$. More preferably the photorefractive glass composition comprises in weight percent as calculated from the batch, about 66.9% $SiO_2$, 6.5% $Al_2O_3$, 16.3% $Na_2O$, 0.75% $K_2O$, 6.5% ZnO, 0.034% Ag, 1.26% Br, 2.5% F and 0.037% $CeO_2$.

Regarding the formation of the glass it is critical that the melting redox conditions remain neutral. This is especially critical for those compositions that include an amount of cerium in the batch composition, based on the critical feature of keeping the Ce in the $Ce^{+3}$ state; i.e., the avoidance of formation of $Ce^{+4}$. Although maintaining reducing conditions would prevent the formation of $Ce^{+4}$, conditions that are too reducing would result in the undesirable effect of reducing the formation of silver metal in the melt. As such, the best melting conditions for avoiding the formation of $Ce^{4+}$ would be neutral melting conditions; i.e., not oxidizing or reducing. This neutral melting condition is best achieved by properly choosing the amount of oxidizing agents which are typically used to reduce the formation of bubbles in the melt (fining agents) or too much of reducing agents such as, $Sb_2O_3$, SnO, or $As_2O_3$. The addition of either SnO or $Sb_2O_3$ in amounts ranging up to about 0.1 wt % are preferred and can be optionally utilized to function to balance the melting redox conditions. The time and the temperature of the melt must also be chosen so as not to result in the conversion of $Ce^{3+}$ to $Ce^{4+}$. In other words, it must be empirically determined by the skilled artisan those melting conditions (composition, utilization of reducing agents, time and temperature) which are best suited to result in the desirable avoidance of the formation of $Ce^{4+}$. In general, this means melting at as low a temperature as possible, and maintaining the appropriate atmosphere.

One embodiment of the present invention relates to a method of making an optical element. The method of this embodiment of the invention is shown in schematic view in FIG. 1. An alumino-silicate NaF-containing glass containing glass material 20 as described above is provided. The glass material 20 is exposed to patterned ultraviolet radiation 22, thereby forming exposed regions 24 and unexposed regions 26. Patterned ultraviolet radiation 22 has a peak wavelength of less than about 300 nm. The exposed glass material is then subjected to a heat treatment step, thereby forming a NaF nanocrystalline phase in the exposed regions 24. In optical element 30, the exposed regions 24a have a substantially different refractive index than unexposed regions 26 after being subjected to the heat treatment.

In the methods according to this embodiment of the invention, the glass material contains silver. Desirably, the glass material includes between about 0.05 wt % and about 0.5 wt % silver. In certain especially desirable embodiments of the present invention, the glass material contains about 0.1% wt % silver. The degree of photosensitivity of the glass material depends on the silver ion concentration. The skilled artisan will choose an appropriate silver concentration, depending on the particular glass composition and the heat treatment conditions to be used.

What we have found is that with certain alkali alumino-silicate NaF-containing glass compositions within the general area of the one mentioned above we can obtain a large photorefractive effect using 248-nm exposure; particularly those Ce-free compositions. The compositional change is to remove the $Ce^{+3}$, or in the case where Ce3+ is present, avoid the formation of $Ce^{4+}$ through proper melting conditions, and rely on other intrinsic or added sources to produce the required photoelectron. Without the presence of $Ce^{4+}$ we have produced glasses with usable transmittance at 248-nm. We have found that in Ce4+-free glasses some degree of photosensitivity can be observed indicating that with the higher exposure energy of 5.2 eV (248-nm) photoelectrons are produced somewhere in the structure. However, we have found that by the addition of a small amount of Ge, one can further enhance the photoelectron production. What this implies is that we produced a photo-electron from a new source in the glass other than $Ce^{+3}$. Notwithstanding that the exposure ultimately produces a NaF phase, it is the first time that the ability to produce this phase has been seen without $Ce^{+3}$.

According to one embodiment of the present invention, the exposure step is carried out with patterned ultraviolet radiation having a peak wavelength ranging between about 240 to 350 nm. The extended exposure wavelength region is produced by combining the new inventive 248 nm mechanism for photosensitization with the old $Ce^{+3}$ mediated mechanism. Both produce the desired NaF phase. Desirably, for the $Ce^{+4}$-free glass the patterned ultraviolet radiation has a peak wavelength of less than about 260 nm. Excimer laser sources operating at 248 nm are especially useful in the methods of the present invention; For example, exposure doses of from about 5 $W/cm^2$ to 5040 $W/cm^2$ at 248 nm can be achieved with a 0.5-28 minute exposure to a pulsed excimer laser operating at 30-50 $mJ/cm^2$/pulse and 5-60 Hz (i.e. pulses/sec). The pattern of the radiation may be formed using methods familiar to the skilled artisan. For example, a phase mask or an absorption mask may be used. Alternatively, a focused beam of radiation may be scanned or rastered along the glass material to form the pattern. Interference techniques (e.g. holography) may also be used. In some embodiments of the invention, even the least exposed regions of the glass material may be subjected to a minor amount of radiation. Further, for certain applications it may be desirable to use patterned radiation having a continuously varying intensity. As such, the term "unexposed region" in the present application is used to designate the regions of the glass material exposed to the least amount of radiation, while the term "exposed region" is used to designate the regions of glass material exposed to the most radiation.

When the longer wavelength exposure is to be utilized ($Ce^{+3}$ with no $Ce^{+4}$) the optimum source is at 355 nm. Exposures with average powers from 100-200 $mW/cm^2$ for times ranging from 5-20 minutes are desirable.

The optical elements formed by the methods of the present invention have a regions of low refractive index (i.e. the exposed regions), and regions of high refractive index (i.e. the unexposed regions). Desirably, the maximum index difference between the exposed regions of the optical element and the unexposed regions of the optical element is at least about $4\times10^{-5}$ measured at a wavelength of 633 nm. More desirably, the maximum index difference between the exposed regions of the optical element and the unexposed regions of the optical element is at least about $1\times10^{-4}$ at a wavelength of 633 nm. Especially desirable optical elements have a maximum index difference between the exposed regions of the optical element and the unexposed regions of at least about $2\times10^{-4}$ at a wavelength of 633 nm. The skilled artisan will adjust the glass composition and exposure conditions in accordance with the present invention in order to maximize the index contrast in the optical element.

Another embodiment of the present invention relates to an optical element including an alumino-silicate NaF-containing glass material having a refractive index pattern formed therein. The refractive index pattern includes regions of high refractive index and regions of low refractive index; the maximum difference between the refractive indices of the high refractive index regions and the low refractive index regions is at least $4\times10^{-5}$ at a wavelength of 633 nm. Desirably, the maximum refractive index is at least about $1\times10^{-4}$ at 633 nm. In especially desirable embodiments of the invention, the refractive index difference is at least about $2\times10^{-4}$. The optical elements according to this embodiment of the invention may be made using the glass materials and methods described hereinabove.

The optical elements made using the methods of the present invention may take a wide variety of shapes. For example, the optical elements may be formed as planar waveguides or optical fibers. In alternative desirable embodiments of the invention, the optical elements may be formed as bulk glass bodies having a smallest dimension longer than about 70 µm. In especially desirable embodiments of the present invention, the optical elements are bulk glass bodies having a smallest dimension longer than about 300 µm. Since the optical elements of the present invention are desirably made in glass materials having relatively low absorbance at 248 nm, the refractive index patterns formed therein may be quite thick. For example, the refractive index pattern may have a smallest dimension of at least 0.1-mm.

In certain embodiments of the invention, the refractive index pattern has a smallest dimension of at least 0.5-mm. In especially desirable embodiments of the invention, the refractive index pattern has a smallest dimension of about 1-mm. In order to provide an increased thickness of the refractive index pattern, the skilled artisan may wish to perform the exposure at a somewhat higher wavelength (e.g. 266 nm).

In order to provide for ease of manufacture into a variety of shapes using standard glass melting techniques, it is desirable for the glass material used in the present invention to have a melting point of less than about 1650° C. In especially desirable embodiments of the present invention, the glass material has a melting point of less than about 1400° C.

The optical elements of the present invention have advantageously high temperature stability. For example, desirable optical elements of the present invention are stable to a temperature of 350° C. Desirably, the optical elements of the present are stable up to the strain point of the glass material. The glass materials described herein have strain points in the range of about 350° C. to about 550° C. As used herein, an optical element is stable if it exhibits a decrease in diffraction efficiency of less than about 10% upon exposure to a given set of conditions.

EXAMPLES

The present invention is further described by the following non-limiting examples.

Example A-D

Glass Formation

The photosensitive glass materials for Example A-D listed in Table 2 were melted using methods familiar to the skilled artisan. Iota sand, boric acid, sodium chloride, sodium nitrate, sodium silicofluoride, antimony trioxide, zinc oxide and alumina were used as batch materials. The batched mixture was ball milled for 60 minutes, melted in platinum crucibles at temperatures of about 1425° C. for four hours, cast into slabs 4 inches wide and 1 inch thick, and annealed at 650° C. Concentrations are given in wt % on an as-batched basis.

TABLE 2

|  | A | B | C | D |
|---|---|---|---|---|
| $SiO_2$ | 69.34 | 69.31 | 69.24 | 68.94 |
| $Al_2O_3$ | 6.65 | 6.64 | 6.64 | 6.60 |
| $Na_2O$ | 15.60 | 15.59 | 15.58 | 15.51 |
| ZnO | 4.82 | 4.81 | 4.81 | 4.79 |
| $Sb_2O_3$ | 0.02 | 0.02 | 0.02 | 0.02 |
| SnO | 0.05 | 0.05 | 0.05 | 0.01 |
| Ag | 0.01 | 0.01 | 0.01 | 0.01 |
| F | 2.41 | 2.41 | 2.40 | 2.87 |
| Br | 1.06 | 1.06 | 1.06 | 1.05 |
| $GeO_2$ | 0 | 0.1 | 0.2 | 0.19 |
| $CeO_2$ | 0.05 | 0 | 0 | 0 |

Example A-D

Exposure Conditions

The so-formed glass material of Examples A-E was formed into 1-mm thick slides as described above. A portion of each slide was exposed to 248 nm radiation from a KrF excimer laser for times ranging from 6-20 minutes at 10 Hz. The fluence per pulse ranged between about 30-60 mJ/cm². The slides were then heat treated in a furnace at 480-520° C. for approximately 2 hours, and allowed to cool to room temperature resulting in the formation of Bragg gratings.

The Bragg gratings so formed in the glass slides were illuminated from the edge of the slide with collimated 633 nm radiation. The diffraction efficiency was used to determine the index contrast between the exposed regions and unexposed regions of the Bragg gratings using the equation $$efficiency = \sin^2\left(\frac{2\pi \Delta n L}{\lambda}\right)$$

where $\lambda$ is the wavelength of the illuminating light, L is the thickness of the grating, and $\Delta n$ is the index contrast between the exposed and unexposed regions of the grating. It follows that a high $\Delta n$ or index contrast results in increased efficiency assuming no change in thickness. Thus if the index contrast is increased/improved the sample thickness can be decreased while still maintaining the diffraction efficiency; i.e., the decrease in L is offset by an increase in the index contrast. Refractive index contrast ($n_{exposed} - n_{unexposed}$) data for Samples A-D are given in Table 3. Good results have also been obtained using much lower total exposures (e.g. 10 Hz pulse rate, 1-minute total time, 40 mJ/cm²/pulse).

TABLE 3

| Example | $n_{exposed} - n_{unexposed}$ (at 633 nm, $\times 10^{-4}$) |
|---|---|
| A | 0.08 |
| B | 0.9 |
| C | 0.3 |
| D | 1.0 |

Example E

Glass Formation

A photorefractive glass materials having a composition in weight percent as calculated from the batch of 66.9% $SiO_2$, 6.5% $Al_2O_3$, 16.3% $Na_2O$, 0.75% $K_2O$, 6.5% ZnO, 0.034% Ag, 1.26% Br, 2.5% F and 0.037% $CeO_2$, was melted and formed into slabs. As for Examples A-D, the batch mixture (as detailed in Table 4) was ball milled for 60 minutes, melted in platinum crucibles at temperatures of about 1425° C. for four hours, cast into slabs 4 inches wide and 1 inch thick, and annealed at 650° C.

TABLE 4

| Batch Material | Weight (g) | Oxide |
|---|---|---|
| Iota Sand | 662.69 | $SiO_2$ |
| Sodium Carbonate | 209.17 | $Na_2O$ |
| Potassium Carbonate | 0.09 | $K_2O$ |
| Zinc Oxide -Zochem | 65.09 | ZnO |
| Silver Oxide | 65.09 | Ag |
| Potassium Bromide | 18.78 | Br |
| Sodium Fluoride | 55.31 | F |
| Alumina —C33 Hydrate | 99.61 | $Al_2O_3$ |
| Cerium (IV) Oxide | 3.7 | $CeO_2$ |

Certain critical/important properties for the Example E glass were measured and are reported in Table 5.

TABLE 5

| Property | |
|---|---|
| Thermal Expansion (0-300° C.) | 88.7 × $10^{-7}$ /° C. |
| Density | 2.516 g/cc |
| Softening Point | 660° C. |
| Annealing Point | 465° C. |
| Strain Point | 427° C. |
| Liquidus Temperature | 810° C. |
| Liquidus Viscosity | 1.851 × $10^{-5}$ poise |
| Refractive Index | 1.501 |

Example E

Exposure

Glass material of the composition of Example E was actually formed into 6 slabs of the 4 inches wide and 1 inch thick dimension disclosed above. The 6 slabs were irradiated through a chrome absorption mask having a 10 μm grating pitch with the output of 355 nm radiation at average power of approximately 12 W at 10 Hz; the exposure times varied for the five samples from 3 to 30 minutes as detailed in Table 6. After irradiation, the samples were heat treated in a furnace at 550° C. for 2 hours to complete the formation of the Bragg gratings.

Figure 2:
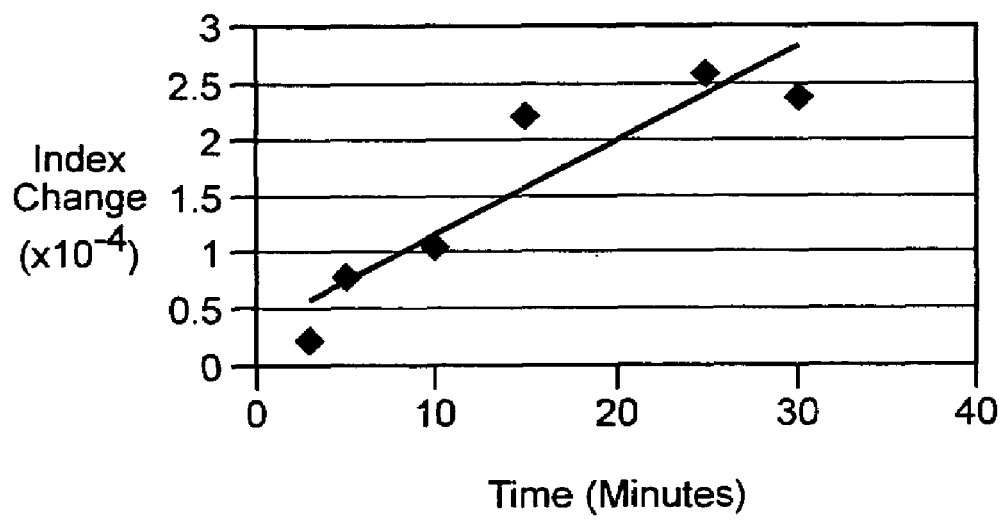
FIG. 2 is a graph illustrating the index change versus time relationship of Bragg grating comprised of Example E glass.

As above, the 6 Bragg gratings so formed in the glass slides were illuminated from the edge of the slide with collimated 633 nm radiation. The diffraction efficiency was again used to determine the index contrast between the exposed regions and unexposed regions of the Bragg gratings. The refractive index contrast ($n_{exposed}-n_{unexposed}$) data for various exposure times are given in Table 6 and plotted in FIG. 2. Like the samples A-D the index contrast exhibited by the sample E slabs, regardless of exposure, exceeds $4\times10^{-5}$.

TABLE 6

| Exposure time, minutes | $n_{exposed} - n_{unexposed}$ (at 633 nm, ×$10^{-4}$) |
|---|---|
| 3 | 0.22 |
| 5 | 0.77 |
| 10 | 1.06 |
| 15 | 2.20 |
| 25 | 2.56 |
| 30 | 2.41 |

Figure 3:
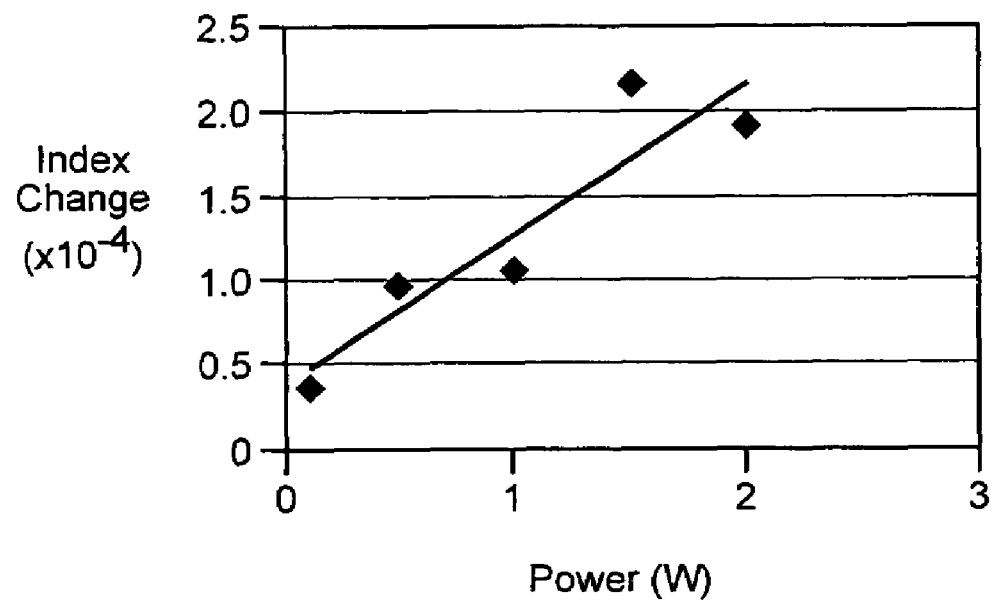
FIG. 3 is a graph illustrating the index change versus power relationship of a bragg grating comprised of Example E glass.

Five additional 1 mm thick samples exhibiting the Example E composition were irradiated in a similar manner as described above (irradiated through a chrome absorption mask having a 10 μm grating pitch with an output of 355 nm radiation), however the power utilized in the exposure was varied from 0.1 to 2 W, while the time exposed for each of the samples remained constant at 10 minutes. Again the diffraction efficiency technique described above was used to estimate the index contrast of the gratings; measured at 633 nm. Exposure results for samples for irradiated at the varying powers are shown are shown in Table 7 and are plotted in FIG. 3; again exceeding $4\times10^{-5}$.

TABLE 7

| Exposure, in power (W) | $n_{exposed} - n_{unexposed}$ (at 633 nm, ×$10^{-4}$) |
|---|---|
| 0.1 | 0.365 |
| 0.5 | 0.96 |
| 1.0 | 1.06 |
| 1.5 | 2.16 |
| 2.0 | 1.91 |

One additional sample of the composition E glass was formed into a Bragg grating in the following manner. This sample was melted and formed into slabs as described above for other Example E samples. In like manner as before, the actual Bragg grating was formed by irradiating the sample through a chrome absorption mask having a 10 μm grating pitch, however this sample was irradiated with a laser output of 248 nm radiation at average power of 170 mW 10 Hz; the exposure time being approximately 10 minutes. This sample was then heat-treated at 520° C. for a period of 2 hours. The diffraction efficiency technique (measured at 633 nm) described above was used to estimate the index contrast of the this grating; the index contrast for this 248 nm irradiated sample ($n_{exposed}-n_{unexposed}$ was $0.6\times10^4$, which compares favorably to those composition E samples above; i.e. a index contrast value exceeding $1\times10^{-4}$. What this sample illustrates is that certain of the inventive embodiments which include an amount of Ce in the batch (but no $Ce^{4+}$ in the so-formed glass) can be exposed/irradiated at either 248 or 355 nm (standard industry laser wavelengths) and still exhibit a good index contrast exceeding $4\times10^{-5}$.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A photorefractive glass composition comprising, in weight percent as calculated from the batch, about 65% to about 75% $SiO_2$, about 5% to about 12% $Al_2O_3$, about 14-18% $Na_2O$, about 0-5% $K_2O$, 0 to about 7.5% ZnO, about 0.01 to 0.1% of a weak balanced reducing agent of either $Sb_2O_3$ or SnO, about 0.005 to 0.5% Ag, about 0.5 to 1.5% Br, about 1.5 to 3.0% F, about 0-0.01% $CeO_2$, and about 0.1 to 0.5% $GeO_2$, wherein the glass composition and/or the melting conditions are such that no $Ce^{4+}$ is present in the so-formed glass.

2. The photorefractive glass of claim 1 wherein the glass composition comprises in weight percent as calculated from the batch, about 69 to 71% $SiO_2$, 6 to 7.5% $Al_2O_3$, 15-17.5% $Na_2O$, 4 to 6% ZnO, 0.01 to 0.1% SnO, 0.01 to 0.05% $Sb_2O_3$, 0.005 to 0.035% Ag, 0.5 to 1.5% Br, 2.0 to 3.0% F, 0-0.1% $CeO_2$, and 0.1 to 0.50% $GeO_2$.

3. The photorefractive glass of claim 1 wherein the glass composition includes 0.5% $CeO_2$.

4. A method for making a photorefractive glass article comprising the steps of:

(a) melting a batch for a glass consisting essentially of, expressed in terms of weight percent on the oxide basis, about 65% to about 75% $SiO_2$; about 5% to about 12% $Al_2O_3$, about 14-18% $Na_2O$, about 0% to about 7.5% ZnO, about 0.01 to 0.1% of a weak reducing agent of either $Sb_2O_3$ or SnO, about 0.005 to 0.5% Ag; about 0.5 to 1.5% Br, about 0.01-0.1% $CeO_2$, and about 0.1 to 0.5% $GeO_2$;

(b) cooling the melt to a temperature at least below the transformation temperature thereof and simultaneously forming a glass body of a desired geometry from the melt, wherein the melting and cooling conditions are such that they are neutral thus resulting in the lack of any $Ce^{+4}$ in so-formed glass body.

5. The method of claim 4, wherein the glass material comprises, in weight percent as calculated from the batch, of about 69 to 71% $SiO_2$, 6 to 7.5% $Al_2O_3$, 15-17.5% $Na_2O$, 4 to 6% ZnO, 0.01 to 0.1% SnO, 0.01 to 0.05% $Sb_2O_3$, 0.005 to 0.035% Ag, 0.5 to 1.5% Br, 2.0 to 3.0% F, 0-0.1% $CeO_2$, and 0.1 to 0.5% $GeO_2$.

* * * * *